United States Patent
Meister et al.

(10) Patent No.: US 11,059,466 B2
(45) Date of Patent: Jul. 13, 2021

(54) METHOD FOR OPERATING A BRAKE SYSTEM OF A MOTOR VEHICLE, AND CONTROL UNIT AND BRAKE SYSTEM

(71) Applicant: Robert Bosch GmbH, Stuttgart (DE)

(72) Inventors: Christian Meister, Sachsenheim (DE); Edith Mannherz, Weinsberg (DE); Frank Baehrle-Miller, Schoenaich (DE); Mike Huff, Plymouth, MI (US)

(73) Assignee: Robert Bosch GmbH, Stuttgart (DE)

( * ) Notice: Subject to any disclaimer, the term of this patent is extended or adjusted under 35 U.S.C. 154(b) by 41 days.

(21) Appl. No.: 16/433,071

(22) Filed: Jun. 6, 2019

(65) Prior Publication Data
US 2019/0375388 A1 Dec. 12, 2019

(30) Foreign Application Priority Data
Jun. 6, 2018 (DE) .................. 10 2018 208 877

(51) Int. Cl.
*B60T 8/92* (2006.01)
*B60T 7/12* (2006.01)
(Continued)

(52) U.S. Cl.
CPC ............... *B60T 8/92* (2013.01); *B60T 7/12* (2013.01); *B60T 8/885* (2013.01); *B60T 7/04* (2013.01);
(Continued)

(58) Field of Classification Search
CPC ... B60T 7/04; B60T 7/042; B60T 7/08; B60T 7/085; B60T 7/12; B60T 7/107; B60T 8/88; B60T 8/92; B60T 8/326; B60T 8/363; B60T 8/885; B60T 8/3255; B60T 13/588; B60T 13/662; B60T 13/667; B60T 13/741; B60T 13/748; B60T 2201/03; B60T 2270/403; B60W 10/188; B60W 10/192; B60W 30/18109; B60W 50/029; B60W 2050/022; B60W 2050/0297; F16F 55/226; F16D 65/183; F16D 2121/04; F16D 2121/24
(Continued)

(56) References Cited

U.S. PATENT DOCUMENTS 3,985,210 A * 10/1976 Hodge .................... B60T 13/22
    188/170
2006/0232124 A1 * 10/2006 Friederich ................ B60T 8/94
    303/3
(Continued)

FOREIGN PATENT DOCUMENTS

DE    10 2004 004 992 A1    9/2005
DE    10 2007 022 510 A1   11/2008

*Primary Examiner* — Robert A. Siconolfi
*Assistant Examiner* — San M Aung
(74) *Attorney, Agent, or Firm* — Maginot, Moore & Beck LLP

(57) ABSTRACT

A method for operating a brake system of a motor vehicle includes actuating at least one of a first actuation device and a second actuation device of the brake system, and, in the event of a fault in a hydraulic brake device of the brake system, producing an electromechanical braking force via an electromechanical brake device of the brake system for decelerating the motor vehicle, irrespective of which of the first actuation device and the second actuation device is actuated.

11 Claims, 2 Drawing Sheets

(51) Int. Cl.
*B60T 8/88* (2006.01)
*B60T 13/66* (2006.01)
*B60T 8/36* (2006.01)
*B60T 7/08* (2006.01)
*B60T 7/04* (2006.01)

(52) U.S. Cl.
CPC ................ *B60T 7/08* (2013.01); *B60T 8/363* (2013.01); *B60T 13/667* (2013.01)

(58) Field of Classification Search
USPC .................................................... 303/122.09
See application file for complete search history.

(56) References Cited

U.S. PATENT DOCUMENTS

2006/0267402 A1* 11/2006 Leiter ..................... B60T 7/107
 303/20
2011/0254357 A1* 10/2011 Vollert ................. B60T 13/586
 303/3
2016/0355171 A1* 12/2016 Mannherz ................. B60T 7/12

* cited by examiner

METHOD FOR OPERATING A BRAKE SYSTEM OF A MOTOR VEHICLE, AND CONTROL UNIT AND BRAKE SYSTEM

This application claims priority under 35 U.S.C. § 119 to patent application no. DE 10 2018 208 877.2, filed on Jun. 6, 2018 in Germany, the disclosure of which is incorporated herein by reference in its entirety.

BACKGROUND

The disclosure concerns a method for operating a brake system of a motor vehicle, and a control unit and a brake system.

DE 10 2004 004 992 A1 discloses a brake system with a parking brake system with an electric brake motor, using which a brake piston can be moved against a brake disc to generate a clamping force for holding the vehicle in a stationary position. The parking brake system may be integrated into the hydraulic motor vehicle brake system. In regular braking operation, the brake piston is pressed against the brake disc by a hydraulic brake fluid.

DE 10 2007 022 510 A1 also describes a brake system with a hydraulic dual-circuit vehicle brake. The brake system is also equipped with an electromechanical brake device which serves as a parking brake and has an electric motor on a brake caliper of the brake system. When actuated by the driver, the electric brake motor may be activated and an electromechanical braking force produced via an electromechanical route in order to perform an emergency braking.

SUMMARY

The problem on which the disclosure is based is solved by a method disclosed herein and by a control unit and a brake system disclosed herein. Advantageous refinements are given in the subclaims. Features important to the disclosure are also presented in the description below and in the drawings, wherein the features may be important for the disclosure both alone and in various combinations, without explicit reference being made to this.

Thus firstly, a method is proposed for operating a brake system of a motor vehicle, with a hydraulic brake device, an electromechanical brake device, a first actuation device, in particular a brake pedal, which can be actuated manually by a user or automatically by an autonomous driving control system, and a second actuation device, in particular a button, which can be actuated manually by a user or automatically by an autonomous driving control system. In the event of a fault in the hydraulic brake device, irrespective of which of the two actuation devices is actuated, on actuation of at least one of the two actuation devices, an electromechanical braking force is produced by means of the electromechanical brake device for decelerating the motor vehicle.

According to the disclosure, despite the malfunction, the vehicle driver may perform an (emergency) deceleration of the motor vehicle using the electromechanical braking force which can be provided, and in particular need not be concerned about whether the first or the second actuation device should be actuated. Rather, the vehicle driver may for example actuate only the first actuation device and an electromechanical braking force is provided. Secondly, the vehicle driver may also actuate only the second actuation device and again an electromechanical braking force is provided. Evidently, the vehicle driver may also actuate both actuation devices and again an electromechanical braking force is provided. As a whole therefore, both by actuation of the first actuation device and also by additional or alternative actuation of the second actuation device, a vehicle deceleration by provision of an electromechanically produced braking force may be requested.

In event of a fault in the hydraulic brake device, consequently an emergency deceleration can be achieved by producing an electromechanical braking force by means of the electromechanical brake device. A malfunction may for example be a partial failure or a complete failure of the hydraulic brake system. Such a malfunction may occur for example due to leakages, failure of a control valve, or in particular also failure of a hydraulic brake booster.

The first actuation device may in particular be a brake pedal, and the second actuation device may be a button. Accordingly, in the event of a fault, the vehicle driver may brake as usual with the brake pedal but nonetheless an emergency deceleration is performed by activation of the electromechanical brake device. Similarly, the vehicle driver may also actuate the button. In other words, a deceleration or in any case an additional deceleration of the motor vehicle by exertion of an electromechanically produced braking force may be requested both via the brake pedal and via the button. As a whole, this increases the safety of the motor vehicle since the driver may routinely actuate the brake pedal and/or the button. For the driver of a motor vehicle therefore, a comparatively simple and feasible possibility of emergency deceleration is created.

The electromechanical brake device may in particular be an automatic parking brake (APB). It is in particular conceivable that, in the intended normal function of the hydraulic brake device, a deceleration of the motor vehicle by the hydraulic brake device is performed both when the first actuation device, for example the brake pedal, is actuated and also when during travel the second actuation device, for example the button, is actuated. In normal operating state, an electromechanical braking force is produced in particular only when the motor vehicle is at a standstill. Only in the event of a fault, because of the proposed fallback strategy, does emergency braking take place by application of an electromechanically produced braking force.

It is understood that the disclosure may also be used in brake systems in which the hydraulic brake device and the electromechanical brake device are completely independent of each other, wherein they comprise separate components. Normally however, for example electric motors of the electromechanical brake device and additional required components, such as for example a spindle and nut system, are integrated directly on a brake caliper of the hydraulic brake device (so-called "motor-on-caliper" system). This is regularly implemented on the wheels of the rear axle of a motor vehicle. This means that the hydraulic brake device and the electromechanical brake device use the same brake caliper and brake piston, and the same brake disc. In this case, the brake caliper may accordingly be displaced either hydraulically or electromechanically.

In one embodiment, the electromechanical braking force produced is only eliminated when both actuation devices are no longer actuated. Accordingly, if only one actuation device is actuated, the electromechanically produced braking force is maintained as long as the actuation device remains actuated. If both actuation devices are actuated, and actuation of just one actuation device is then ended, the electromechanically produced braking force is nonetheless sustained until the other actuation device is also no longer actuated.

In a further embodiment, the electromechanical braking force produced on actuation of the first actuation device is different from the electromechanical braking force produced on actuation of the second actuation device. In particular, the electromechanical braking force produced on actuation of exclusively the first actuation device may be lower than that produced on exclusive actuation of the second actuation device. If the first actuation device is configured as a brake pedal and only this actuation device is actuated, for example on a merely partial failure of the hydraulic brake device, in particular due to failure of the brake booster, nonetheless a certain hydraulic braking force can still be provided by means of the hydraulic brake device and thereby a deceleration of the vehicle can be ensured. The electromechanically produced braking force is here superimposed on the hydraulically produced braking force and amplifies this. In order however to reduce over-braking and in particular the risk of locked wheels during the additional electromechanical deceleration, the electromechanically produced braking force may in this case in particular be lower than if only the second actuation device is actuated. The second actuation device may in this context in particular be a button in the vehicle. If this button is actuated, in particular no hydraulic braking force is produced but only an electromechanical braking force. In order nonetheless to be able to safely decelerate the vehicle, the electromechanically produced braking force may in this case in particular be higher than if only the brake pedal is actuated.

It is furthermore conceivable that on actuation of both actuation devices, the higher of the two electromechanical braking forces is produced. In this way, vehicle safety is increased since it is ensured that a sufficiently great deceleration is provided in order in particular to decelerate the vehicle to a standstill. In particular, it may be provided that when both actuation devices are actuated, only an electromechanically produced braking force is generated even if, in the event of a fault, a certain level of hydraulic braking force could still be produced. In this way, in particular a definable deceleration of the vehicle is provided since there is no superposition of the hydraulic and electromechanical braking forces.

It is furthermore conceivable that when both actuation devices have been actuated and actuation of one actuation device is ended, the higher of the two electromechanical braking forces is still produced. This ensures that, in the event of a malfunction of the hydraulic brake system, a sufficient deceleration of vehicle can still be provided.

Furthermore, it may be provided that a predetermined electromechanical braking force is produced. In this way, in particular deceleration sensors, using which the electromechanical braking force produced can be adapted based on detected vehicle decelerations, may be omitted. Rather, a predetermined electromechanical braking force can be produced in a comparatively simple fashion. This force may differ depending on whether only the first actuation device or only the second actuation device or both actuation devices are actuated. If only the first actuation device, in particular configured as a brake pedal, is actuated, the predetermined electromechanically produced braking force may be so high that an additional vehicle deceleration may thereby be provided, in addition to any hydraulic (residual) braking force produced by the hydraulic brake system and the associated hydraulically produced deceleration. This additional deceleration value may be between 0.5 m/s2 and 1.5 m/s2, in particular 1 m/s2. Preliminary tests may determine in advance for the respective vehicle how much electromechanically produced braking force is necessary to produce a specific (additional) vehicle deceleration.

If only the second actuation device, configured in particular as a button, is actuated, the vehicle deceleration may be greater than on actuation of solely the first actuation device. For example, the braking force produced may correspond to a vehicle deceleration of 1.5 to 2 m/s2.

If both actuation devices are actuated, it may in particular be provided that the higher braking force is produced, i.e. in particular the electromechanical braking force which is provided when only the second actuation device is actuated, i.e. for example a braking force which leads to a deceleration of 1.5 to 2 m/s2. A hydraulically produced braking force may in this case lead to an additional deceleration. In particular however, when both actuation devices are actuated, it may be provided that only the electromechanically produced braking force is generated.

In this context, it is conceivable that on a detected slippage, the amount of the electromechanical braking force is adapted following an anti-lock control strategy. If slippage is detected, this anti-lock control system may be started in particular both when only the first or the second actuation device is actuated and also when both actuation devices are actuated. Accordingly, the anti-lock control system may be started on wheel slippage, in particular independently of which actuation device is actuated. It is conceivable that the control system starts only if slippage is detected of the wheel to which the electromechanically produced braking force is applied. However, it is also conceivable that the anti-lock control system is started on slippage of any of the vehicle wheels. The anti-lock control system may in particular function as follows: if one of the two actuation devices is actuated, an electromechanical braking force is produced which may in particular be sufficiently high that thereby a desired (additional) deceleration of the vehicle is achieved. If a wheel slippage is detected on one or more wheels during application of this electromechanical braking force, the electromechanically produced braking force is in any case reduced or completely eliminated so that at most a hydraulically produced braking force remains.

Then the electromechanically produced braking force is gradually increased again. As soon as a slippage occurs however, the electromechanical braking force is reduced or eliminated again. Thus by means of the electromechanical brake device, a rudimentary ABS function can be achieved. This could also be described as an RWU (Rear Wheel Unlocker), since the electromechanical brake device may in particular be fitted on the rear axle wheels of the vehicle. This in particular improves the driving stability and avoids uncontrolled vehicle reactions. In particular, a vehicle with an electromechanical brake device can thereby be braked dynamically.

We also propose that the first actuation device is configured as a brake pedal. Here it is conceivable that when only the first actuation device is actuated, the electromechanical braking force is only exerted when the amount of the pedal actuation (for example, the pedal travel covered or the pedal force applied) reaches or exceeds a limit value. In particular, if only a partial failure of the hydraulic brake device is present, it may be undesirable to provide an additional electromechanical deceleration when the brake pedal is merely lightly actuated. Thus it is conceivable that the additional electromechanical deceleration is provided only on stronger actuation of the brake pedal, in order to provide the additional deceleration for the vehicle when this is actually necessary because of a strong brake pedal actuation by the driver. In this context, the pedal actuation is in particular the displacement distance (pedal travel) of the brake pedal.

When the pedal actuation is 100%, the brake pedal is moved into the maximal end brake position. It is for example conceivable that an electromechanical braking force is produced only when the pedal actuation amounts to between 40% and 60%, in particular at least 50% (brake pedal half pressed).

In this context, in particular it is conceivable that the electromechanically provided deceleration is eliminated only when the brake pedal is no longer actuated at all. However, it is also conceivable that the electromechanically produced deceleration is eliminated already at for example 10% to 30% pedal actuation. Accordingly, the electromechanically produced braking force may be provided on a greater pedal actuation compared with the pedal actuation for elimination of the braking force. Thus the system is advantageously given a hysteresis property or inertia.

According to the disclosure, a control device is provided for a brake system of a motor vehicle, which is designed and configured to perform the method according to the disclosure. The brake system may accordingly in particular comprise a processor and a memory for executing the method according to the disclosure.

Finally, according to the disclosure also a brake system for a motor vehicle is proposed, with a hydraulic brake device, an electromechanical brake device, a first actuation device, in particular a brake pedal, and a second actuation device, in particular a button. The brake system furthermore comprises a control device according to the disclosure. This brake system allows, in particular in the event of a failure of the hydraulic brake device, an increase in vehicle safety in that the vehicle driver can in particular brake in the usual fashion by actuating the first actuation device, configured in particular as a brake pedal. Evidently, the vehicle driver may however, also or alternatively, actuate the second actuation device, configured in particular as a button. As a whole, thereby an electromechanically produced braking force may be provided without the vehicle driver having to consider whether he need actuate the first or second actuation device.

BRIEF DESCRIPTION OF THE DRAWINGS

Further features, possible applications and advantages of the disclosure arise from the following description of exemplary embodiments of the disclosure which are explained with reference to the drawing.

The drawing shows.

DETAILED DESCRIPTION

Figure 1:
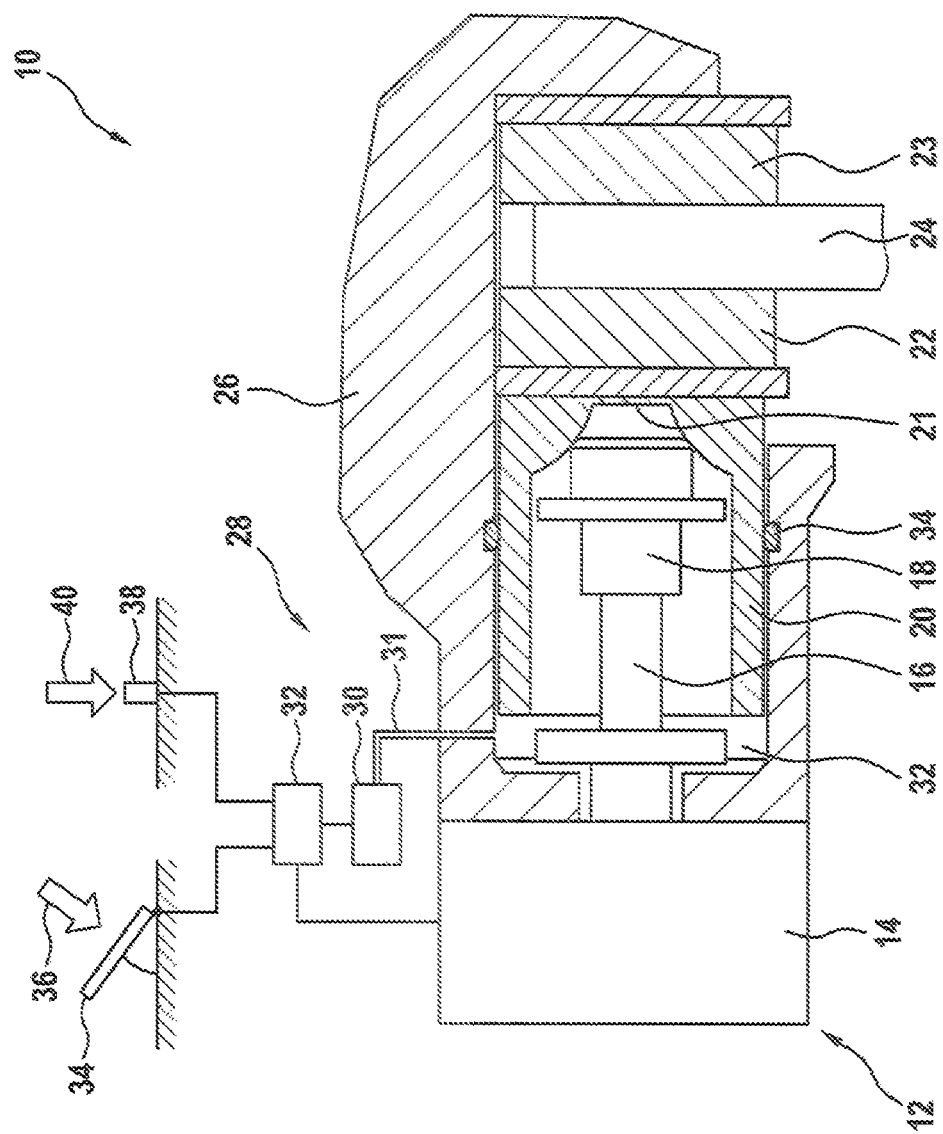
FIG. 1 a diagrammatic, sectional view of a brake system of a vehicle with a hydraulic and an electromechanical brake device in "motor-on-caliper" design.

A brake system of a motor vehicle is designated as a whole with reference sign 10 in FIG. 1. The motor vehicle itself is not shown in FIG. 1. It may however be any motor vehicle, for example a car, a motorcycle or a truck. The brake system 10 may in particular be provided on the rear axle of the motor vehicle.

The brake system 10 firstly has an automatic parking brake 12 (APB for short) configured as an electromechanical brake device, which by means of an actuator 14 (e.g. electric brake motor or motor-gear unit) can exert an electromechanically produced clamping force (electromechanical braking force) for keeping the vehicle stationary. For this, the actuator 14 of the parking brake 12 drives a spindle 16, in particular a threaded spindle, which is mounted on bearings in an axial direction. At its end facing away from the actuator 14, the spindle 16 is provided with a spindle nut 18 which lies against a brake piston 20 when the automatic parking brake 12 is applied. In this way, the parking brake 12 electromechanically transmits a force to brake pads 22, 23 and hence to a brake disc 24 which is connected rigidly or rotationally fixedly to a vehicle wheel (not shown), in particular a wheel on a rear axle of the motor vehicle. The spindle nut 18 here bears on an inner end face 21 of the brake piston 20 (also called the back of the brake piston crown or inner piston crown). The spindle nut 18 is moved in the axial direction on a rotary motion of the actuator 14 and a resulting rotary motion of the spindle 16. The spindle nut 18 and the brake piston 20 are mounted in a brake caliper 26 which spans the brake disc 24 in the manner of pincers. A brake pad 22, 23 is arranged on either side of the brake disc 24. When an application process of the brake system 10 is triggered by the automatic parking brake 12, the electric motor (actuator 14) rotates, whereupon the spindle nut 18 and brake piston 20 are moved in the axial direction towards the brake disc 24, in order to generate a predetermined clamping force between the brake pads 22, 23 and the brake disc 24. Because of the spindle drive and the associated self-locking effect, a force produced by means of the parking brake 12 by actuation of the actuator 14 is sustained even after the end of actuation. The brake system according to FIG. 1 is configured as a "motor-on-caliper" system. This means that the parking brake 12 is combined with a hydraulic brake device configured as a service brake 28. The parking brake 12 could also be regarded as integrated in the system of the service brake 28. Both the automatic parking brake 12 and the service brake 28 act on the same brake piston 20 in order to build up a braking force on the brake disc 24. The service brake 28 however has a separate actuator 30. In FIG. 1, the service brake 28 is configured as a hydraulic system, wherein the actuator 30 may be formed by an ESP pump or an electromechanical brake booster (e.g. Bosch iBooster). Further embodiments of the actuator 30 are also conceivable, for example in the form of an IPB (Integrated Power Brake) which in principle constitutes a brake-by-wire system in which a plunger is used to build up hydraulic pressure. On normal service braking, a predefined clamping force is built up hydraulically between the brake pads 22, 23 and the brake disc 24. To build up a braking force by means of the hydraulic service brake 28, a medium 31, in particular a substantially incompressible brake fluid, is pressed into a fluid chamber delimited by the brake piston 20 and the brake caliper 26. The brake piston 20 is sealed against the environment by means of a piston sealing ring 34.

On actuation of the automatic parking brake 12, firstly the idle travel or air gap must be overcome before a braking force can be built up. The idle travel is the distance which the spindle nut 18 must overcome by rotation of the spindle 16 in order to come into contact with the brake piston 20. The air gap is the distance between the brake pads 22, 23 and the brake disc 24 in a disc brake system of motor vehicles. At the end of such a preparatory phase, the brake pads 22, 23 bear on the brake disc 24 and the force begins to build up on further or continued actuation. FIG. 1 shows the state in which the idle travel and air gap have already been overcome. Here, the brake pads 22, 23 bear against the brake disc 24, and on subsequent actuation, all brakes, i.e. the parking brake 12 and the service brake 28, can immediately build up a braking force at the corresponding wheel. The descriptions relating to the air gap apply similarly to the service brake 28, wherein however, because of the high pressure-buildup dynamic, overcoming the air gap takes less time than for the parking brake.

Actuation of the brake actuators 14 and 30 takes place by means of an end stage, i.e. by means of a control device 32 which for example may be a control unit of a driving dynamics systems, such as for example ESP (Electronic Stability Program) or another control device.

The brake system 10 also includes a first actuation device or first actuation element, in the present case for example in the form of a brake pedal 34 which may be actuated by the driver of the vehicle in the direction of arrow 36. Finally, the brake system 10 also includes a second actuation device or second actuation element 38, for example in the form of a button which may be actuated by the driver in the direction of arrow 40.

The brake system 10 as a whole works as follows:

In a regular operating state of the brake system 10 with properly functioning hydraulic vehicle brake 28, to implement a driver's braking wish, the vehicle is braked via the hydraulic vehicle brake 28 when the driver actuates the brake pedal 34. The electromechanical brake device 12 is activated automatically when the vehicle is at a standstill. Furthermore, this may be activated manually at the request of the driver by actuating the actuating element 38. If the actuating element 38 is actuated in regular operation while the vehicle is moving, a hydraulic braking force produced by means of the hydraulic brake device 18 is also applied to the brake disc 24.

Figure 2:
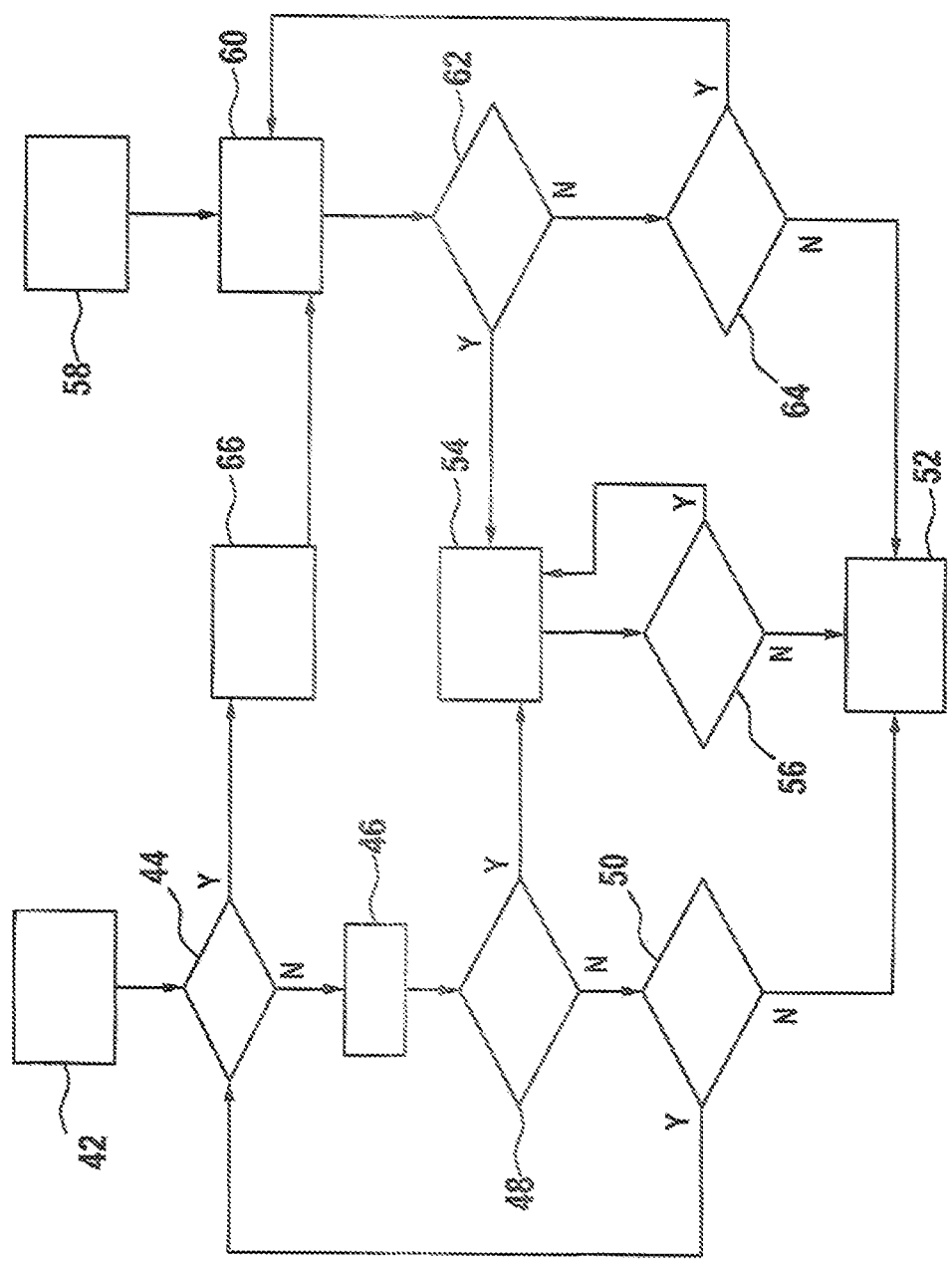
FIG. 2 a flow diagram with method steps for decelerating the vehicle on a malfunction of the hydraulic brake device.

In contrast, in the event of a fault, the brake system 10 is operated in a fallback level following the method steps shown in FIG. 2. A malfunction may for example be a failure or partial failure of the brake booster of the hydraulic vehicle brake 28. Here, the control device 32 is configured and designed to perform the method shown in FIG. 2:

In a step 42, the driver of the vehicle actuates the brake pedal 34 and thus expresses a braking request. However, the control device 32 has established that the hydraulic brake device 28 is defective or is not working at all.

Accordingly, in step 44 it is firstly checked whether the actuating element 38 is actuated. If this is not the case, in step 46 the electromechanical brake device 12 is actuated by the control device 32 in order to build up an electromechanical braking force. Here, in particular, a predetermined braking force may be produced. This may in particular be sufficiently high to decelerate the vehicle with a deceleration of 1 m/s2. This electromechanical target braking force, which leads to a predefined vehicle deceleration, can be determined in advance for each vehicle and implemented accordingly. On partial failure of the hydraulic brake system 28, the deceleration provided may be overlaid with a deceleration based on a residual, hydraulically produced braking force. Thus for example it would be conceivable that the brake booster of the hydraulic brake device 28 fails, but a deceleration of 0.5 m/s2 can still be provided by the hydraulic brake device 28. Accordingly, in addition to the hydraulic braking force, a further electromechanically provided deceleration of for example 1 m/s2 may be provided by the electromechanical brake device 12.

In a next step 48, it is then checked whether slippage occurs at one or more wheels of the vehicle. Such a slippage may for example occur due to leaves or snow, or because of a superposition of a residual, hydraulically produced braking force and an additional, electromechanically produced braking force.

If no slippage occurs, in step 50 it is checked whether the brake pedal 34 is still actuated. If the brake pedal 34 is still actuated, the method returns to step 44. If the brake pedal is no longer actuated, in step 52 the electromechanical brake device 12 is controlled so that no further electromechanical braking force is produced.

If however in step 48 a slippage is detected, an anti-lock strategy is applied in step 54. Here, the electromechanical brake device 12 is alternately applied and released. In particular, the applied electromechanically produced braking force may be increased in stages. This is accordingly a rudimentary ABS function, so that the vehicle can be dynamically braked with the electromechanically produced braking force. If at a particular time the electromechanically produced braking force is completely eliminated by releasing the electromechanical brake device 12, at most a hydraulic braking force from the malfunctioning hydraulic brake device 28 remains, so that over-braking is in any case reduced by this anti-lock strategy in step 54.

In this step 54, an electromechanically produced braking force may be produced which leads to an (additional) deceleration of 1 m/s2 as in step 46, or a higher braking force may be applied to create a greater deceleration of for example 1.5 m/s2. If the anti-lock strategy is applied, in step 56 it is then checked whether the brake pedal is still pressed. If this is still the case, the method returns to step 54. If this is not the case, in step 52 again the electromechanically produced braking force is eliminated.

If however only the actuating element 38 is pressed in step 58, and the control device 32 has established that the hydraulic brake device 28 is malfunctioning, in step 60 an electromechanically produced braking force is generated for actuating the electromechanical brake device 12. The electromechanical braking force may be sufficiently high to lead to a vehicle deceleration of 1.5 m/s2. Here, it is firstly conceivable that with a still partially functioning hydraulic brake device 28, in addition a hydraulically produced braking force is generated. However, in particular it is conceivable that in step 60 exclusively an electromechanically produced braking force is generated by means of the electromechanical brake device 12. In step 62, in a similar fashion to step 48, it is then checked whether a slippage of at least one vehicle wheel occurs. If a slippage occurs, the method again switches to the anti-lock strategy according to steps 54 to 56.

If no slippage occurs, in step 64 it is again checked whether the actuating element 38 is still actuated. If this is the case, the method proceeds with step 60. If this is not the case, in step 52 the electromechanical brake device 12 is controlled such that the electromechanically produced braking force is eliminated.

If it is detected in step 44 that both the brake pedal 34 and the actuating element 38 are actuated, in step 66 it is decided that then step 60 is performed and thus an electromechanically produced braking force is generated by means of the electromechanical brake device 12, to the level which applies when only the actuating element 38 is actuated. If initially the actuating element 38 and the brake pedal 34 are actuated, and then one of the two actuating elements is no longer actuated, nonetheless steps 60 to 64 are repeated until it established in step 64 that neither of the actuating elements 34, 38 is actuated. Only then is the electromechanical braking force completely eliminated in step 52.

If both actuating elements 34 and 38 are actuated and in step 62 a slippage is established, the method again switches to the anti-lock strategy according to steps 54 to 56. Here it is checked in step 56 whether at least one actuating element 34, 38 is still actuated. If this is not the case, in step 52 the electromechanically produced braking force is eliminated.

It is conceivable that in step 46, an electromechanically produced braking force is generated only when the brake pedal 34 is pressed to a specific extent, i.e. a specific limit value of the maximal pedal travel has been exceeded. This may for example be 50% of the pedal travel. Furthermore, it is conceivable that in step 50, the electromechanically produced braking force is eliminated already when the brake pedal is still displaced to a specific limit value. This limit value may for example be 20% of the maximal displacement distance.

Irrespective of whether initially the brake pedal 34 or only the actuating element 38, or both actuating elements 34, 38 are pressed, on a detected slippage in step 48 or 62, the method switches to the anti-lock strategy according to step 54.

As a whole, by means of the fallback strategy according to method steps 42 to 66 in FIG. 2, vehicle safety may be increased. If in fact the hydraulic brake device 28 fails at least partially, then in order to brake in an emergency, the driver need no longer consider whether he must press the brake pedal 34 or the actuating element 38. Irrespective of which of the two actuating elements 34, 38 is pressed, an electromechanically produced braking force may be provided to decelerate the vehicle.

What is claimed is:

1. A method for operating a brake system of a motor vehicle, the brake system including a hydraulic brake device, an electromechanical brake device, a first actuation device configured to actuate at least one brake pad, and a second actuation device configured to actuate the at least one brake pad, the method comprising:
    actuating at least one of the first actuation device and the second actuation device; and
    in an event of a fault in the hydraulic brake device, producing an electromechanical braking force via the electromechanical brake device for decelerating the motor vehicle, irrespective of which of the first actuation device and the second actuation device is actuated.

2. The method according to claim 1, further comprising: eliminating the electromechanical braking force only when the first actuation device and the second actuation device are no longer actuated.

3. The method according to claim 1, wherein a first value of the electromechanical braking force produced on actuation of the first actuation device is different from a second value of the electromechanical braking force produced on actuation of the second actuation device.

4. The method according to claim 3, wherein on actuation of both the first actuation device and the second actuation device, the greater of the first value of the electromechanical braking force and the second value of the electromechanical braking force is produced.

5. The method according to claim 4, wherein, when both the first actuation device and the second actuation device have been actuated and actuation of one of the first actuation device and the second actuation device has ended, the greater of the first value of the electromechanical braking force and the second value of the electromechanical braking force continues to be produced.

6. The method according to claim 1, wherein the electromechanical braking force that is produced is predetermined.

7. The method according to claim 1, further comprising:
    detecting a slippage; and
    upon detection of the slippage, adapting an amount of the electromechanical braking force following an anti-lock control strategy.

8. The method according to claim 1, wherein:
    the first actuation device is a brake pedal; and
    when only the first actuation device is actuated, the producing of the electromechanical braking force only occurs when an amount of a pedal actuation of the brake pedal reaches or exceeds a limit value.

9. The method according to claim 1, wherein a control device is configured to perform the method.

10. The method according to claim 1, wherein the second actuation device is a button.

11. A brake system for a motor vehicle, comprising:
    a hydraulic brake device;
    an electromechanical brake device;
    a first actuation device configured to actuate at least one brake pad;
    a second actuation device configured to actuate the at least one brake pad; and
    a control device configured to:
        actuate the second actuation device; and
        in an event of a fault in the hydraulic brake device when the first actuation device is actuated, actuate the second actuation device to produce an electromechanical braking force via the electromechanical brake device for decelerating the motor vehicle.

* * * * *